United States Patent [19]

Gross et al.

[11] Patent Number: 4,857,600

[45] Date of Patent: Aug. 15, 1989

[54] PROCESS FOR GRAFTING DIACID ANHYDRIDES

[75] Inventors: Laurence H. Gross, Bridgewater, N.J.; Thorne M. Bartlett, Victoria, Tex.

[73] Assignee: Union Carbide Corporation, Danbury, Conn.

[21] Appl. No.: 197,331

[22] Filed: May 23, 1988

[51] Int. Cl.$^4$ .................. C08L 255/02; C08L 255/04; C08L 255/08

[52] U.S. Cl. ........................................ 525/285; 525/53

[58] Field of Search ................................. 525/53, 285

[56] References Cited

U.S. PATENT DOCUMENTS

| | | | |
|---|---|---|---|
| 3,161,620 | 12/1964 | Perkins et al. | 525/285 |
| 3,642,722 | 2/1972 | Knowles et al. | 525/285 |
| 3,671,608 | 6/1972 | Meredith et al. | 525/53 |
| 3,819,765 | 6/1974 | O'Shea | 525/301 |
| 3,928,497 | 12/1975 | Ohmori et al. | 525/285 |
| 3,953,541 | 4/1976 | Fuji | 525/303 |
| 4,314,041 | 2/1982 | Shimokawa et al. | 525/53 |
| 4,506,056 | 3/1985 | Gaylord | 524/445 |
| 4,762,890 | 8/1988 | Strait et al. | 525/285 |

Primary Examiner—Carman J. Seccuro
Attorney, Agent, or Firm—Saul R. Bresch

[57] ABSTRACT

A process for grafting an anhydride of an unsaturated aliphatic diacid onto a polyolefin comprising:

(a) passing molten polyolefin through at least two injection zones connected in series;

(b) injecting, under grafting conditions, a portion of a solution comprising the anhydride, an organic peroxide catalyst, and an inert organic solvent into the molten polyolefin as it passes through each injection zone, and mixing same in each injection zone until the portion is at least partially grafted onto the polyolefin; and (c) passing the grafted polyolefin, in the molten state, into a devolatilization zone, and mixing same in said zone, under devolatilization conditions, until the grafted polyolefin is essentially devolatilized.

33 Claims, No Drawings

PROCESS FOR GRAFTING DIACID ANHYDRIDES

TECHNICAL FIELD

This invention relates to a process for grafting unsaturated aliphatic diacid anhydrides onto a polyolefin.

BACKGROUND ART

Some of the major technological applications for unsaturated aliphatic diacid anhydrides, particularly maleic anhydride, grafted polyolefins is to form adhesive olefin polymers, compatibilized olefin polymers, and reversible crosslinked base resins. Maleic anhydride grafted polyolefins also find utility as adhesion promoters because of their compatibility with polar copolymers such as ethylene/ethyl acrylate copolymers, ethylene/vinyl acetate copolymers, polyesters, and polyamides because of the nature of the anhydride group.

Various techniques have been proposed for preparing maleic anhydride grafted polyolefins. Grafting techniques require an initial preblending, soaking, or spraying of the maleic anhydride onto the polyolefin. This still requires hot melt processing of the mixture after the soak or spray. Batch solution grafting has also been demonstrated. In all of these techniques, the objective is to achieve a high level of grafting without substantial increases in molecular weight (measured as substantial decreases in melt index). Those skilled in the art are constantly striving to optimize the anhydride level with minimal increases in molecular weight, and to prepare the anhydride and resin in a more efficient manner for extrusion.

DISCLOSURE OF THE INVENTION

An object of this invention, therefore, is to provide a grafting process, which achieves a high anhydride level of incorporation in the resin without undue increases in molecular weight, therefore maintaining the flow properties of the original polyolefin to a higher degree than previously described techniques. Lower flow indices will, of course, reduce the ease of extrusion.

Other objects and advantages will become apparent hereinafter.

According to the present invention, the above object is met by a process for grafting an anhydride of an unsaturated aliphatic diacid onto a polyolefin comprising:

(a) passing molten polyolefin through at least two injection zones connected in series; and (b) injecting, under grafting conditions, a portion of a solution comprising the anhydride, an organic peroxide catalyst, and an inert organic solvent into the molten polyolefin as it passes through each injection zone, and mixing same in each injection zone until the portion is at least partially grafted onto the polyolefin.

More particularly, the process is one for grafting an anhydride of an unsaturated aliphatic diacid having 4 to 20 carbon atoms onto a polyolefin comprising the following steps:

(i) introducing polyolefin into an inlet zone, and melting and mixing same;

(ii) passing the molten polyolefin through at least two injection zones connected in series;

(iii) injecting, under grafting conditions, a portion of a solution comprising the anhydride, an organic peroxide catalyst, and an inert organic solvent into the molten polyolefin as it passes through each injection zone, and mixing same in each injection zone until the portion is at least partially grafted onto the polyolefin; and (iv) passing the grafted polyolefin, in the molten state, into an outlet zone, and mixing same in said zone, under devolatilization conditions, until the grafted polyolefin is essentially devolatilized.

DETAILED DESCRIPTION

Anhydrides of unsaturated aliphatic diacids having 4 to 20 carbon atoms, and preferably 4 to 10 carbon atoms, are commonly grafted to various polyolefins. Examples of anhydrides, which are useful in subject invention, are maleic anhydride, itaconic anhydride, and crotonic anhydride. The preferred anhydride is maleic anhydride. The amount of anhydride injected into the extruder is in the range of about 0.01 to about 15 percent by weight based on the weight of polyolefin and is preferably in the range of about 0.5 to about 5 percent by weight. Excess anhydride is removed by devolatilization at temperatures in the range of about 200° C. to about 250° C.

The grafting is accomplished by using an organic peroxide catalyst, i.e., a free radical generator, such as dicumyl peroxide, lauroyl peroxide, benzoyl peroxide, tertiary butyl perbenzoate, di(tertiary butyl) peroxide, cumene hydroperoxide, 2,5 dimethyl 2,5-di(t-butylperoxy) hexyne 3, 2,5 dimethyl-2,5-di(t-butylperoxy)-hexane, tertiary butyl hydroperoxide, isopropyl percarbonate, and alpha,alpha'-bis(tertiary-butylperoxy) diisopropylbenzene. About 0.001 to about 5 percent by weight of organic peroxide catalyst based on the weight of the polyolefin is used. The preferred range for the catalyst is about 0.005 to about 0.2 percent by weight. The organic peroxide catalyst may be added together with the anhydride solution.

The polyolefins, which are contemplated here, cover a wide range of homopolymers and copolymers based on two or more different monomers. The various monomers on which the polyolefins are based include alpha-olefins and diolefins having 1 to 20 carbon atoms and particularly the lower alpha olefins such as ethylene, propylene, 1-butene, 1-hexene, and 1-octene having 2 to 12 carbon atoms. The polyolefins most commonly used for maleic or other anhydride grafting are the homopolymers of ethylene and propylene, copolymers of ethylene and alpha olefins having 3 to 12 carbon atoms, copolymers of propylene and alpha-olefins having 4 to 12 carbon atoms, and terpolymers such as those in which the first comonomer is ethylene, the second comonomer is ethyl acrylate, vinyl acetate, propylene, 1-butene, 1-hexene, or 1-octene, and the third comonomer is ethylidene norbornene or vinyl trimethoxy silane, vinyl triethoxy silane, vinyl isobutoxy silane, or other vinyl trialkoxy silanes. Of particular interest here are the copolymers of ethylene and one or more alpha-olefins having 3 to 8 carbon atoms having a density in the range of about 0.87 to about 0.97 gram per cubic centimeter and having a melt index of about 0.05 to about 100.

Various types of mixers and extruders can be used to carry out subject process. A single or twin screw extruder and a co-kneader can be mentioned in this respect. The device requires inlet and outlet zones, and at least two injection zones, each zone containing an injection port. There can be 2 to 10 injection ports, and there are preferably 3 to 6 such ports. In addition, heating means is provided to maintain the resin in a molten state throughout the process and mixing means is also required to keep the resin in a state of agitation for the same period. Since the twin screw extruder is a very efficient mixing device, it is preferred. The mixing can be accomplished by a threaded screw, an impeller, or other device incorporated into the body of the mixer or extruder. A typical extruder has a hopper at its upstream end and a die at its downstream end. The hopper feeds into a barrel, which contains a screw. At the downstream end, between the end of the screw and die, a screen pack and a breaker plate may be included. The screw portion of the extruder is considered to be divided up into three sections, the feed section, the compression section, and the metering section, and two zones, the back heat zone and the front heat zone, the sections and zones running from upstream to downstream. If it has more than one barrel, the barrels are connected in series. The length to diameter ratio of each barrel is in the range of about 5:1 to 30:1. It will be understood that the inlet, outlet, and injection zones as used in this specification are not necessarily coextensive with those zones, which are named as parts of a typical extruder. Rather, the inlet, outlet, and injection zones can be located in one barrel or in several barrels. They are simply areas which are of sufficient length and have adequate heating and mixing means to effect the melting, mixing, grafting, or devolatilization to be accomplished in the particular area or zone. Thus, off-the shelf equipment can be easily converted to provide the required zones.

The points of introduction of the anhydride solution can be referred to as injection ports since the introduction is usually accomplished with an injection device such as a high pressure pump with lines to mixer or extruder ports. There is one injection zone for each injection port. In an extruder, the injection ports are located at points along the axis of the barrel, and are, e.g., about equidistant from each other and the upstream and downstream ends of the barrel. While there can be from 1 to 3 ports per barrel, and from 1 to 5 barrels, a preferred configuration has 3 ports for 4 barrels, one port in each of the first three barrels, the first barrel being at the inlet or upstream end and the fourth barrel at the discharge or downstream end of the extruder. In all cases, the injection ports are preferably located at about the axis of the barrels. Assuming the barrel to have a cylindrical shape, the axis is that of the cylinder. It can also be referred to as the axis running from the upstream end of the barrel to the downstream end. The positioning of the injection ports along the axis is adjusted to achieve the most efficient mix. This adjustment can be accomplished by those having ordinary skill in the extrusion art. The objective is to provide sufficient length between ports to accomplish the required mixing and reacting in order to graft the injected portion of the anhydride onto the polyolefin. In the inlet zone and outlet zone, sufficient length is provided for melting and devolatilization, respectively.

Grafting/extrusion temperatures for polyethylene or polypropylene are in the range of about 150° C. to about 400° C. and are preferably in the range of about 180° C. to about 250° C. The process is generally conducted in the continuous mode.

As noted, a solution of anhydride, preferably maleic anhydride, an organic peroxide catalyst, and an organic solvent are introduced into the extruder or mixer at two or more points. The organic peroxide catalyst is, of course, soluble in the organic solvent. Various organic solvents, which are inert to the reaction taking place in the mixer or extruder, can be used. Examples of useful organic solvents are acetone, methyl ethyl ketone, methyl propyl ketone, 3-pentanone, and other ketones. Other carrier solvents which allow solubilization of peroxide and anhydride and which strip off well under appropriate devolatilization conditions may be used. Acetone is a preferred solvent in the system because it acts as a stripping agent for residuals such as non grafted anhydride or anhydride by products. In any case, extraction analysis shows lower quantities of residuals in samples from subject process than in dry blend samples.

The injected anhydride solution contains about 10 to about 50 percent by weight anhydride; about 0.05 to about 5 percent by weight organic peroxide catalyst; and about 50 to about 90 percent by weight organic solvent based on the total weight of the solution. A preferred solution contains about 20 to about 40 percent anhydride; about 0.1 to about 2 percent peroxide; and about 60 to about 80 percent solvent.

Advantages of subject process are as follows:

1. There are significantly less changes in flow properties than occur using a dry blending technique, i.e., adding a masterbatch to the extruder.

2. Higher combinations of melt index and maleic anhydride concentration in the polyolefin are achieved.

3. The use of subject process facilitates reduction in residuals. The reduction can be further improved by changing the ratio of anhydride to solvent and modifying and optimizing the devolatilization equipment.

Conventional additives can also be added to the extruder or mixer. The solution of anhydride, peroxide, and organic solvent may be injected before or after all of the additives have been added. This will depend on the nature of the additives and their function. The amount of additive is usually in the range of about 0.01 to about 60 percent by weight based on the weight of the resin. Useful additives are antioxidants, ultraviolet absorbers, antistatic agents, pigments, dyes, fillers, slip agents, fire retardants, plasticizers, processing aids, lubricants, stabilizers, smoke inhibitors, viscosity control agents, vulcanizing agents, crosslinking agents, crosslinking catalysts, and crosslinking boosters.

The grafting of anhydrides such as maleic anhydride to nonpolar polyolefins is a technique for making nonpolar polyolefin compatible with polar polymers, for example, a blend of maleic anhydride grafted high density polyethylene and an ethylene/vinyl alcohol copolymer provides a material with thermoplastic elastomer characteristics.

The invention is illustrated by the following examples:

EXAMPLES 1 to 16

The examples are the result of a set of statistically designed experiments to study the effects of seven variables on the grafting/extrusion process. These variables are:

1. level of organic peroxide catalyst
2. die temperature
3. resin type, molecular weight, and density
4. method of addition
5. maleic anhydride level
6. stearamide (see U.S. Pat. No. 4,506,056 issued Mar. 19, 1985 incorporated by reference herein)
7. throughput rate For a two level fractional factorial design in seven variables, sixteen experiments are required. See Box, Hunter and Hunter, Statistics for Experimenters, published by John Wiley and Sons, New York, 1978, page 410. The entire publication is incorporated by reference herein. These sixteen experiments provide a procedure by which all first order effects can be separated from each other. The effects of interest are change in flow index (FI) and the level of maleic anhydride grafted.

Flow index is defined below.

The level of maleic anhydride grafted is determined by Fourier transform infrared spectroscopy.

The extruder used is a four barrel twin screw extruder; the four barrels being connected in series. The screws are operated at 300 rpm. Preceding the first barrel is a hopper into which the resin, masterbatch, and any other additives, except for the maleic anhydride/peroxide/solvent solution, are introduced.

If the method of addition is via masterbatch, the dry blend masterbatch is prepared in a Henschel Mixer as follows: all components (resins, maleic anhydride, peroxide, and in some examples, stearamide) are added to the mixer; they are mixed for 45 seconds; and then discharged into a foil coated drum, which is purified with nitrogen and sealed.

The total length of the extruder is 1800 millimeters; each barrel is 385 millimeters in length; and the first barrel is connected to the hopper. If the method of addition of the anhydride and peroxide is via solution, three injection ports are used, one in each of the first three barrels; all of the ports are located on the barrel axis; the port in the first barrel is located 330 millimeters from the upstream end of the barrel; the other two ports are each located 170 millimeters from the upstream end of the barrel in which they are located. Each barrel has a length to diameter ratio of about 7:1; and kneading blocks are located in the first barrel, between injection ports, and between vacuum point and die.

Analysis of the data via log probability plotting (see Box, Hunter and Hunter, Chapter 12) shows that the use of the three port injection for adding maleic anhydride gives significantly lower drops in the flow index than dry blending masterbatch addition with no sacrifice in other properties. The acetone, which is only a carrier for the maleic anhydride and peroxide, is forced to flash off and passes out of the system at a devolatilization port near the downstream end of the extruder. The other variables have little or only the expected effect on the properties of the grafted resin.

The experimental design and compositions are shown in Table I and conditions, set points, measurements, and results are set forth in Table II.

NOTES TO TABLE I

1. The organic peroxide catalyst is 2,5-dimethyl-2,5-di(t-butylperoxy)hexane and the amount is given in percent by weight based on the weight of the resin.

2. The melt temperature is the temperature of the resin melt and is given in degrees Centigrade. It is the same as item 9 in Table II.

3. The resin is either I or II.

Resin I is a polyethylene having a density of 0.953 grams per cubic centimeter and a melt index of 7.5.
Resin II is a polyethylene having a density of 0.951 grams per cubic centimeter and a melt index of 17.
100 parts by weight of each resin is used.

4. The addition method, i.e., method of addition of maleic anhydride and organic peroxide, and stearamide, if used, is either A or B.
  A is by master batch dryblending of resin and liquids.
  B is by liquid solution injection (subject process).

5. The amount of maleic anhydride (MAH) is given in percent by weight based on the weight of the resin.

6. The amount of stearamide is given in percent by weight based on the weight of maleic anhydride. It is a constant 10 mole percent of the level of maleic anhydride.

NOTES TO TABLE II

1. Resin rate (lbs/hr) is the number of pounds per hour of resin passing through the extruder.

2. Solution rate (lbs/hr) is the number of pounds per hour of MAH/organic peroxide/acetone solution passing through the extruder.

3. MB rate (lbs/hr) is the number of pounds per hour of masterbatch passing through the extruder. The masterbatch includes resin, MAH, organic peroxide, and, in some cases, stearamide. The masterbatch in examples 9, 10, 15, and 16 includes 75 percent by weight resin and 25 percent by weight stearamide.

Items numbered 4, 5, 6, 7, and 8 in Table II refer to the four barrels and the die of the extruder. The set temperature and the measured (ind) temperature are given in ° Centigrade.

9. The temperature of the melt which is aimed for is given in ° Centigrade.

10. The actual melt temperature is given in ° Centigrade.

11. The residence time of the composition in the extruder is given in seconds. The value is the average of the range of residence times recorded under the same conditions and is the number of seconds each pound of composition is present in the extruder.

12. Melt Index (MI) is determined under ASTM D 1238, Condition E. It is measured at 190° C. and reported as grams per 10 minutes (g/10 min).

13. Flow Index (FI) is determined under ASTM D-1238, Condition F. It is measured at 10 times the weight used in the melt index test above. The value given is the average of two flow indices determined for the same composition.

14. Percent maleic anhydride (MAH) represents the amount of maleic anhydride incorporated into (reacted with or grafted onto) the resin. The value is given in percent by weight based on the weight of the resin.

15. The change in flow index ($-\Delta$FI) is determined as follows: the negative of the final flow index after grafting minus the original flow index (188 for Resin I and 425 for Resin II).

TABLE I

| Example | peroxide (%) | melt (°C.) | resin | addition method | MAH (%) | stearamide (%) |
|---|---|---|---|---|---|---|
| 1 | 0.05 | 200 | I | A | 2 | — |
| 2 | 0.15 | 200 | I | A | 5 | — |
| 3 | 0.05 | 250 | I | A | 5 | 1.44 |
| 4 | 0.15 | 250 | I | A | 2 | 0.58 |
| 5 | 0.05 | 200 | II | A | 5 | 1.44 |
| 6 | 0.15 | 200 | II | A | 2 | 0.58 |
| 7 | 0.05 | 250 | II | A | 2 | — |
| 8 | 0.15 | 250 | II | A | 5 | — |
| 9 | 0.05 | 200 | I | B | 2 | 0.58 |
| 10 | 0.15 | 200 | I | B | 5 | 1.44 |
| 11 | 0.05 | 250 | I | B | 5 | — |
| 12 | 0.15 | 250 | I | B | 2 | — |
| 13 | 0.05 | 200 | II | B | 5 | — |

TABLE I-continued

| Example | peroxide (%) | melt (°C.) | resin | addition method | MAH (%) | stearamide (%) |
|---|---|---|---|---|---|---|
| 14 | 0.15 | 200 | II | B | 2 | — |
| 15 | 0.05 | 250 | II | B | 2 | 0.58 |
| 16 | 0.15 | 250 | II | B | 5 | 1.44 |

TABLE II

| Example | 1 | 2 | 3 | 4 | 5 | 6 | 7 | 8 |
|---|---|---|---|---|---|---|---|---|
| 1. Resin rate (lbs/hr) | 90 | 40 | 80 | 45 | 40 | 90 | 45 | 80 |
| 2. Solution rate (lbs/hr) | — | — | — | — | — | — | — | — |
| 3. MB rate (lbs/hr) | 10 | 10 | 20 | 5 | 10 | 10 | 5 | 20 |
| 4. Barrel 1: set (°C.) | neutral | neutral | neutral | neutral | neutral | neutral | neutral | neutral |
| ind (°C.) | neutral | neutral | neutral | neutral | neutral | neutral | neutral | neutral |
| 5. Barrel 2: set (°C.) | 225 | 225 | 250 | 250 | 220 | 215 | 250 | 275 |
| ind (°C.) | 263 | 284 | 250 | 295 | 225 | 237 | 264 | 275 |
| 6. Barrel 3: set (°C.) | 175 | 200 | 185 | 250 | 200 | 175 | 225 | 210 |
| ind (°C.) | 173 | 200 | 280 | 341 | 245 | 273 | 307 | 195 |
| 7. Barrel 4: (°C.) | 175 | 165 | 150 | 175 | 165 | 135 | 205 | 175 |
| ind (°C.) | 178 | 165 | 156 | 180 | 168 | 139 | 207 | 167 |
| 8. Die: set (°C.) | 150 | 175 | 150 | 200 | 165 | 140 | 205 | 175 |
| ind (°C.) | 154 | 170 | 188 | 203 | 169 | 140 | 208 | 168 |
| 9. Melt (aim) (°C.) | 200 | 200 | 250 | 250 | 200 | 200 | 250 | 250 |
| 10. Melt (actual) (°C.) | 202 | 195 | 252 | 254 | 204 | 196 | 246 | 300/210 |
| 11. Residence time (sec) (average) | 48 | 86 | 53 | 80 | 77 | 49 | 83 | — |
| 12. MI A (g/10 min) | 0.18 | 0.04 | 0.54 | 0.19 | 5.84 | 0.91 | 1.13 | 0.04 |
| B (g/10 min) | 0.46 | 0.06 | 1.00 | 0.14 | 5.30 | 0.97 | 1.37 | 0.04 |
| 13. FI (average) | 49 | 18.6 | 66.5 | 27.0 | 271 | 72.3 | 110 | 28.8 |
| 14. % MAH | 3.02 | 3.9 | 0.1 | 1.62 | 0 | 0.55 | 3.7 | 4.2 |
| 15. $-\Delta$FI | 1.39 | 169 | 122 | 160 | 154 | 353 | 315 | 396 |

| Example | 9 | 10 | 11* | 12 | 13 | 14 | 15 | 16 |
|---|---|---|---|---|---|---|---|---|
| 1. resin rate (lbs/hr) | 44 | 87.5 | 46 | 95 | 95 | 45 | 95 | 45 |
| 2. solution rate (lbs/hr) | 5 | 12.5 | 12.5 | 10 | 12.5 | 5 | 5 | 6.25 |
| 3. MB rate (lbs/hr) | 1.16 | 5.8 | — | — | — | — | 2.32 | 2.9 |
| 4. Barrel 1: set (°C.) | 225 | neutral | neutral | neutral | neutral | neutral | neutral | neutral |
| ind (°C.) | 276 | neutral | neutral | neutral | neutral | neutral | neutral | neutral |
| 5. Barrel 2: set (°C.) | 200 | 225 | — | 225 | 200 | 225 | 250 | 250 |
| ind (°C.) | 302 | 250 | — | 253 | 223 | 250 | 253 | 257 |
| 6. Barrel 3: set (°C.) | 165 | 200 | — | 225 | 200 | 175 | 250 | 250 |
| ind (°C.) | 169 | 310 | — | 311 | 285 | 200 | 264 | 272 |
| 7. Barrel 4: set (°C.) | neutral | 150 | — | 175 | 125 | 175 | 175 | 175 |
| ind (°C.) | neutral | 166 | — | 184 | 152 | 162 | 181 | 178 |
| 8. Die: set (°C.) | 165 | 165 | — | 175 | 150 | 150 | 200 | 200 |
| ind (°C.) | 167 | 179 | — | 211 | 186 | 165 | 206 | 200 |
| 9. Melt (aim) (°C.) | 200 | 200 | 250 | 250 | 200 | 200 | 250 | 250 |
| 10. Melt (actual) (°C.) | 204 | 208 | — | 252 | 204 | 205 | 250 | 246 |
| 11. Residence time (sec) (average) | 77.5 | 43.5 | — | 43.5 | 45.5 | 78 | 49 | — |
| 12. MI A (g/10 min) | 4.31 | 2.49 | — | 1.34 | 2.26 | 4.42 | 9.65 | 8.62 |
| B (g/10 min) | 5.48 | 3.83 | — | 0.83 | 1.49 | 4.11 | 8.96 | 4.22 |
| 13. FI (average) | 198 | 133 | — | 99.4 | 164 | 229 | 410 | 295 |
| 14. % MAH | 2.7 | 0.55 | — | 3.8 | 1.6 | 3.7 | 0.9 | 0.35 |
| 15. $-\Delta$FI | −10 | 55 | — | 88.6 | 261 | 196 | 15 | 130 |

*The composition of Example 11 does not strand at given rate.

We claim:

1. A process for producing a polyolefin grafted with an unsaturated aliphatic diacid anhydride which comprises:
   (a) adding and mixing molten polyolefin, one or more aliphatic diacid anhydride compositions, organic peroxide, and inert organic solvent in a first reaction zone, under reaction conditions, to produce a partially grafted polyolefin product;
   (b) sequentially passing said partially grafted polyolefin product from said first reaction zone through a series of one or more reaction zones; and
   (c) mixing additional aliphatic diacid anhydride, organic peroxide, and inert solvent with said partially grafted product, under reaction conditions, in each successive reaction zone until the desired level of grafting is achieved.

2. The process defined in claim 1 wherein the anhydride has 4 to 20 carbon atoms.

3. The process defined in claim 1 wherein the anhydride is maleic anhydride.

4. The process defined in claim 1 wherein the solvent is acetone.

5. The process defined in claim 1 wherein the process is continuous.

6. The process defined in claim 1 wherein the anhydride has 4 to 8 carbon atoms.

7. The process defined in claim 1 wherein the solution is introduced into the different zones about simultaneously.

8. The process defined in claim 1 wherein the solution is introduced along the axis of each reaction zone, said axis running from the upstream end to the downstream end of the reaction zone.

9. The process defined in claim 1 wherein there are about 3 to 10 reaction zones.

10. The process defined in claim 1 wherein there are 3 to 6 reaction zones.

11. The process defined in claim 1 wherein the polyolefin is based on a major proportion of ethylene or propylene.

12. A process for producing a polyolefin grafted with an unsaturated aliphatic diacid anhydride which comprises:
   (a) continuously adding and mixing molten polyolefin, aliphatic diacid anhydride, organic peroxide, and inert organic solvent in a first reaction zone under reaction conditions;

(b) continuously passing the grafted reaction product from said first reaction zone into a second reaction zone; and (c) adding and mixing additional aliphatic diacid anhydride, organic peroxide, and inert solvent to said grafted reaction product in said second reaction zone.

13. The process defined in claim 12 wherein the anhydride has 4 to 20 carbon atoms.

14. The process defined in claim 12 wherein the anhydride is maleic anhydride.

15. The process defined in claim 12 wherein the solvent is acetone.

16. The process defined in claim 12 wherein the process is continuous.

17. The process defined in claim 12 wherein the anhydride has 4 to 8 carbon atoms.

18. The process defined in claim 12 wherein the solution is introduced into the different zones about simultaneously.

19. The process defined in claim 12 wherein the solution is introduced along the axis of each reaction zone, said axis running from the upstream end to the downstream end of the reaction zone.

20. The process defined in claim 12 wherein the polyolefin is based on a major proportion of ethylene or propylene.

21. A process for grafting an anhydride of an unsaturated aliphatic diacid onto a polyolefin comprising:

(a) passing molten polyolefin through at least two injection zones connected in series; and (b) injecting, under grafting conditions, a portion of a solution comprising the anhydride, an organic peroxide catalyst, and an inert organic solvent into the molten polyolefin as it passes through each injection zone, and mixing same in each injection zone until the portion is at least partially grafted onto the polyolefin.

22. The process defined in claim 21 including the following additional step:

(d) removing essentially all unreacted volatile impurities from the final grafted product.

23. The process defined in claim 21 including the following additional step:

(c) passing the grafted polyolefin, in the molten state, into a devolatilization zone, and mixing same in said zone, under devolatilization conditions, until the grafted polyolefin is essentially devolatilized.

24. The process defined in claim 22 wherein the anhydride has 4 to 20 carbon atoms.

25. The process defined in claim 24 wherein the anhydride is maleic anhydride.

26. The process defined in claim 22 wherein the solvent is acetone.

27. The process defined in claim 22 wherein the process is continuous.

28. The process defined in claim 22 wherein the solution is introduced into the different zones about simultaneously.

29. The process defined in claim 22 wherein the solution is introduced along the axis of the injection zone, said axis running from the upstream end to the downstream end of the injection zone.

30. The process defined in claim 22 wherein there are about 3 to 10 injection zones.

31. The process defined in claim 22 wherein the polyolefin is based on a major proportion of ethylene or propylene.

32. A continuous process for grafting an anhydride of an unsaturated aliphatic diacid having 4 to 20 carbon atoms onto a polyolefin comprising the following steps:

(i) introducing the polyolefin into an inlet zone, and melting and mixing same in said zone;

(ii) passing the molten polyolefin through at least two injection zones connected in series;

(iii) injecting, under grafting conditions, a portion of a solution comprising the anhydride, an organic peroxide catalyst, and an inert organic solvent into the molten polyolefin as it passes through each injection zone, and mixing same in each injection zone until the portion is at least partially grafted onto the polyolefin; and (iv) passing the grafted polyolefin, in the molten state, into an outlet zone, and mixing same in said zone, under devolatilization conditions, until the grafted polyolefin is essentially devolatilized.

33. The process defined in claim 32 wherein each zone is of sufficient length from upstream end to downstream end to effect melting, reacting, or devolatilization, as the case may be.

* * * * *